(12) United States Patent
Shen et al.

(10) Patent No.: US 9,853,968 B2
(45) Date of Patent: Dec. 26, 2017

(54) SYSTEMS AND METHODS FOR AUTHENTICATING USERS ACCESSING A SECURE NETWORK WITH ONE-SESSION-ONLY, ON-DEMAND LOGIN CREDENTIALS

(71) Applicants: Winifred Shen, Elmhurst, NY (US); Joe Shen, Elmhurst, NY (US)

(72) Inventors: Winifred Shen, Elmhurst, NY (US); Joe Shen, Elmhurst, NY (US)

(*) Notice: Subject to any disclaimer, the term of this patent is extended or adjusted under 35 U.S.C. 154(b) by 0 days.

(21) Appl. No.: 15/240,634

(22) Filed: Aug. 18, 2016

(65) Prior Publication Data
US 2017/0054711 A1 Feb. 23, 2017

Related U.S. Application Data

(60) Provisional application No. 62/207,198, filed on Aug. 19, 2015.

(51) Int. Cl.
  H04L 29/06 (2006.01)
  G06Q 30/02 (2012.01)
  G06F 21/45 (2013.01)
(52) U.S. Cl.
  CPC ......... *H04L 63/0838* (2013.01); *G06F 21/45* (2013.01); *G06Q 30/0204* (2013.01);
  (Continued)
(58) Field of Classification Search
  None
  See application file for complete search history.

(56) References Cited

U.S. PATENT DOCUMENTS 7,233,997 B1 6/2007 Leveridge et al.
8,195,819 B1 6/2012 Delker et al.
(Continued)

FOREIGN PATENT DOCUMENTS

CA 2337414 8/2001
CN 201584981 U 9/2010
(Continued)

OTHER PUBLICATIONS

Keewifi—Features [online], [retrieved on Aug. 17, 2016]. Retrieved from the Internet: <URL: http://www.keewifi.com/features.html>.
(Continued)

*Primary Examiner* — Kaveh Abrishamkar
(74) *Attorney, Agent, or Firm* — Bryan Cave LLP

(57) ABSTRACT

Systems and methods are disclosed for providing an unregistered user with access to a network in a secure and efficient manner. A random, on-demand password is generated and the password is associated with an account that permits the user to access the network for a single session only. The account is also associated with a specific IP address. Entry of the password permits access to the network on the IP address associated with the account. At the conclusion of the single session, the password is disposed of such that it will no longer enable access to the network. An access point associated with the network can also be configured to collect marketing information by pairing the IP address with a virtual IP address, in which a user's demographic information is embedded. Such configuration can be used to aggregate data concerning the network activities of users with similar demographic characteristics.

18 Claims, 7 Drawing Sheets

(52) U.S. Cl.
CPC ............... *G06F 2221/2101* (2013.01); *G06F 2221/2117* (2013.01); *G06F 2221/2137* (2013.01)

(56) References Cited

U.S. PATENT DOCUMENTS

| | | | |
|---|---|---|---|
| 8,213,393 | B2 | 7/2012 | Suganthi et al. |
| 8,272,036 | B2 | 9/2012 | Jou et al. |
| 8,413,215 | B2 | 4/2013 | Satarasinghe et al. |
| 8,434,138 | B2 | 4/2013 | Popp et al. |
| 8,495,714 | B2 | 7/2013 | Jones et al. |
| 8,594,628 | B1 | 11/2013 | Schroeder et al. |
| 8,605,697 | B2 | 12/2013 | Kuo et al. |
| 8,683,562 | B2 | 3/2014 | Ting et al. |
| 8,832,807 | B1 | 9/2014 | Kuo et al. |
| 8,910,300 | B2 | 12/2014 | Varsavsky Waisman-Diamond et al. |
| 8,966,036 | B1* | 2/2015 | Asgekar ............ G06F 7/00 707/706 |
| 9,015,855 | B2 | 4/2015 | Waisman-Diamond et al. |
| 2003/0229549 | A1* | 12/2003 | Wolinsky ........ G06Q 30/0248 705/14.61 |
| 2005/0086346 | A1 | 4/2005 | Meyer |
| 2006/0069914 | A1 | 3/2006 | Rupp et al. |
| 2007/0180101 | A1* | 8/2007 | Chen ............ H04L 67/22 709/224 |
| 2007/0253553 | A1* | 11/2007 | Abdul Rahman ...... G06F 21/31 380/259 |
| 2008/0065892 | A1 | 3/2008 | Baily et al. |
| 2008/0244076 | A1 | 10/2008 | Shah et al. |
| 2011/0167154 | A1* | 7/2011 | Bush ............ H04L 12/2807 709/224 |
| 2013/0073388 | A1* | 3/2013 | Heath ............ G06Q 50/01 705/14.53 |
| 2013/0159079 | A1 | 6/2013 | Singh et al. |
| 2013/0346526 | A1* | 12/2013 | Rawat .............. G06Q 10/107 709/206 |
| 2015/0223068 | A1* | 8/2015 | Thelen ............ H04L 63/083 726/7 |

FOREIGN PATENT DOCUMENTS

| | | |
|---|---|---|
| CN | 104243448 | 12/2014 |
| WO | 0000904 | 1/2000 |
| WO | 2007128134 | 11/2007 |

OTHER PUBLICATIONS

CPlane Networks—Secure Multi-Tenant Networking [online], [retrieved on Aug. 17, 2016]. Retrieved from the Internet: <URL: http://www.cplanenetworks.com/use-case-01/>.
Google Search [online], [retrieved on Aug. 17, 2016]. Retrieved from the Internet: <URL: https://www.google.com/search?q=random+%2Bon-demand+%2Bone-session+%2Bpassword+%2Bvirtual&sourceid=ie7&rls=com.microsoft:en-US:IE-Address&ie=&oe=&rlz=&gws_rd=ssl#safe=off&q=guest+%2Bnetwork+%2Bon-demand+%2Bpassword+%2Bvirtual>.
Cisco Support Community, "What is guest SSID, and how is it configured?", [online] Mar. 31, 2015, [retrieved on Aug. 17, 2016]. Retrieved from the Internet: <URL: https://supportforums.cisco.com/document/27926/what-guest-ssid-and-how-it-configured>.
Lynn, "10 Ways to Set Up Your Wi-Fi for Holiday Guests", [online] Dec. 9, 2013, [retrieved on Aug. 17, 2016]. Retrieved from the Internet: <URL: http://www.pcmag.com/article2/0,2817,2428032,00.asp>.
Cisco, "Guest WLAN and Internal WLAN using WLCs Configuration Example", [online] May 4, 2009, [retrieved on Aug. 17, 2016]. Retrieved from the Internet: <URL: http://www.cisco.com/c/en/us/support/docs/wireless-mobility/wireless-vlan/70937-guest-internal-wlan.html>.
"Creating a Virtual Network of Linux Guests using VirtualBox", [online] Sep. 11, 2013, [retrieved on Aug. 17, 2016]. Retrieved from the Internet: <URL: https://sandilands.info/sgordon/creating-a-virtual-network-of-linux-guests-using-virtualbox>.
How-To Geek, "How to Enable a Guest Access Point on Your Wireless Network", [online] Apr. 22, 2013, [retrieved on Aug. 17, 2016]. Retrieved from the Internet: <URL: http://www.howtogeek.com/153827/how-to-enable-a-guest-access-point-on-your-wireless-network/>.
Notification of Transmittal of the International Search Report and the Written Opinion of the International Searching Authority or the Declaration; International Search Report, and Written Opinion, issued in PCT/US2016/047597, dated Nov. 2, 2016.

\* cited by examiner

| Market Code | Gender<br>1st digit of Market Code | Age<br>2nd digit of Market Code | Race<br>3rd digit of Market Code |
|---|---|---|---|
| 0 | Female | <13 | White |
| 1 | Male | 13-20 | Black |
| 2 | Transgender | 20's | Hispanic |
| 3 | | 30's | Asian |
| 4 | | 40's | |
| 5 | | 50's | |
| 6 | | 60's | |
| 7 | | 70's | |
| 8 | | 80's | |
| 9 | | 90's | |

| Walk-in time | Customer | IP address | Gender | Age | Race | Market Code | Virtual IP Address with Market Code |
|---|---|---|---|---|---|---|---|
| 12:03 PM | Kevin | 192.168.1.001 | Male | 40's | White | 141 | 192.168.1.141 |
| 12:07 PM | Tom | 192.168.1.002 | Male | 40's | White | 141 | 192.168.1.141 |
| 12:17 PM | Joe | 192.168.1.003 | Male | 50's | Asian | 154 | 192.168.1.154 |
| 12:21 PM | Winifred | 192.168.1.004 | Female | 13-20 | Asian | 014 | 192.168.1.14 |
| 12:37 PM | Oprah | 192.168.1.005 | Female | 60's | Black | 062 | 192.168.1.62 |
| 12:45 PM | Dora | 192.168.1.006 | Female | <13 | Hispanic | 003 | 192.168.1.3 |

| Market Code | Spending Habits | Age | Gender / Race |
|---|---|---|---|
| | 1st character of Market Code | 2nd character of Market Code | 3rd character of Market Code |
| 0 | | < 13 | Male, White |
| 1 | Low spending | 13-20 | Male, Black |
| 2 | Low spending with marketing product (coupon) | 20's | Male, Hispanic |
| 3 | Low spending with core product | 30's | Male, Asian |
| 4 | Average spending | 40's | Female, White |
| 5 | Average spending with marketing product (coupon) | 50's | Female, Black |
| 6 | Average spending with core product | 60's | Female, Hispanic |
| 7 | Average spending with marketing product (coupon) / core product | 70's | Female, Asian |
| 8 | High spending | 80's | Transgender, White |
| 9 | High spending with marketing product (coupon) | 90's | Transgender, Black |
| A | High spending with core product | | Transgender, Hispanic |
| B | High spending with marketing product (coupon) / core product | | Transgender, Asian |

SYSTEMS AND METHODS FOR AUTHENTICATING USERS ACCESSING A SECURE NETWORK WITH ONE-SESSION-ONLY, ON-DEMAND LOGIN CREDENTIALS

CROSS-REFERENCE TO RELATED APPLICATIONS

The present application claims benefit to U.S. Provisional Patent Application No. 62/207,198 filed on Aug. 19, 2015. The contents of the aforementioned application are hereby incorporated by reference in their entirety.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent files or records, but otherwise reserves all copyright rights whatsoever.

FIELD OF THE INVENTION

The present principles are directed to systems and methods for accessing communication networks and, more particularly, to techniques for enabling unregistered users to access wireless access points or wired network devices.

BACKGROUND

As a result of the popularity, demand and success of Internet services over the past two decades, a company's ability to provide network access (e.g., Wi-Fi access) has evolved from a mere luxury to a necessity. It is not uncommon for companies to invest heavily in network administration resources to maintain secure networks for registered users (e.g., employees, customers who pay subscription fees, or members who register accounts). The architecture that is established permits such registered users to access a network in a manner that is relatively secure. However, the current options for providing network access to unregistered users (e.g., walk-in customers in a coffee shop, non-member individuals who do not have registered accounts or logins for a network, visitors in a hospital, or guests in a building with Wi-Fi access) is very limited and inadequate for a number of reasons.

For unregistered users, a network administrator typically offers a "no-password" or "one-password-for-all" option that enables the users to access a local network. However, offering network access in either manner makes the entire network vulnerable to security breaches. In addition, these techniques permit users to access the network anonymously without any supervision or monitoring. As a result, the users may engage in undesirable activities (e.g., such as committing cybercrimes) without being held accountable.

With a no-password option, anyone can access the network—even those individuals who are simply walking along a sidewalk (e.g., window-shopping) outside of the store location or sitting in a parking lot near the store location. With a one-password-for-all policy, customers who are initially given the password may keep the password for future use and/or provide the password to other individuals. Because of this, many user devices and Wi-Fi hotspot devices are not compliant with effective security standards and are, therefore, not secure. Thus, while these non-secure authentication systems provide easy access to networks, they also permit users to easily steal customer access and account login information, and to engage in other harmful activities on the network.

Although there are some existing approaches for authorizing unregistered users to access network resources, these approaches do not allow for the implementation of security measures to reduce vulnerability and criminal mischief (as described above) in a simple and efficient manner. For example, common approaches for authorizing unregistered users to access a network require network administrators to create a unique user account (e.g., which requires a valid username and password) for each active user. These accounts are constantly monitored and reinforced with a policy that periodically changes or updates the passwords associated with the accounts. While these authorization techniques may suffice for managing registered users, they are inadequate for unregistered users who typically are seeking quick and easy access to the network.

Other deficiencies associated with providing network access to unregistered users relate to the inability to effectively track and/or aggregate data associated with the users. For example, current techniques do not enable network administrators to easily track the network activities of unregistered users (e.g., to assist law enforcement in monitoring criminal activity) while they interact with the network.

Likewise, current techniques do not enable the network administrator to aggregate data (e.g., demographic information) associated with the unregistered users for marketing or other purposes. For example, various users of different ages, ethnic groups, and gender or of different spending habits may visit different websites or engage in other behavior while accessing the network as unregistered users. The activities of these different groups or categories of users could provide information valuable for marketing, advertising, or promoting various products. However, current approaches do not allow network administrators to capture any of this information.

Similarly, current approaches do not permit blocking of network access where appropriate or desired. For example, a network administrator may desire to provide limited access to the network for certain users, such as to prevent a child user from accessing websites that promote cigarettes or alcohol, or to block pop-ups of certain advertisements. However, current approaches only allow network administrators to provide access to the entire network or to deny access entirely.

In view of the above, there is a need for systems and methods that provide unregistered users with quick and easy, but secure, access to the Internet without the need for supervision or monitoring. There is further a need for systems and methods that conveniently and efficiently record, monitor, manage and aggregate data associated with the unregistered users' network activities.

SUMMARY OF THE INVENTION

In embodiments of the invention, on request from a user seeking access to a network, a system generates a random password and the password is associated with an account that permits the user to access the network for a single session only. The account is also associated with a specific IP address. Entry of the password permits access to the network on the IP address associated with the account. At the conclusion of the single session, the password is disposed of such that it will no longer enable access to the network. An access point associated with the network can also be configured to collect marketing information by pairing the IP address with a virtual IP address. The virtual IP address is encoded such that it is indicative of certain demographic information associated with the user. The network activities of the user can be monitored and stored in a marketing file associated with the virtual IP address. The stored information can then be aggregated for users having the same or similar demographic characteristics. The network activities of the user can be limited based upon the user's demographic profile, which is embedded in the virtual IP address.

Embodiments of the invention include a computerized method for providing secure access to a network comprising the steps of: (i) receiving a demand from a user to access the network; (ii) in response to receiving the demand, generating a random password at an access point device; (iii) activating, with a processor, an account that enables the user to access the network for a single session—wherein activating the account includes: (a) selecting an Internet protocol (IP) address to be assigned to the account; (b) associating the IP address with the account; and (c) associating the random password with the account such that the random password enables a user device operated by the user to access the network with the IP address for the single session, wherein the random password is temporarily stored on a non-transitory storage medium and the random password only provides access to the network when it is used within a pre-determined period of time after the random password is generated; (iv) receiving an input at the access point device to access the network, the input being submitted from the user device and including the random password; (v) connecting the user device to the network for the single session; and (vi) in response to determining that the single session is terminated or expired, deactivating the account.

Embodiments of the invention also include a system for providing secure access to a network, comprising at least one computing device having at least one processor and physical memory, the physical memory storing instructions that cause the processor to: (i) receive a demand from a user to access the network; (ii) in response to receiving the demand, generate a random password at an access point device; (iii) activate an account that enables the user to access the network for a single session—wherein activating the account includes: (a) selecting an Internet protocol (IP) address to be assigned to the account; (b) associating the IP address with the account; and (c) associating the random password with the account such that the random password enables a user device operated by the user to access the network with the IP address for the single session, wherein the random password is temporarily stored on the physical memory and the random password only provides access to the network when it is used within a pre-determined period of time after the random password is generated; (iv) receive an input at the access point device to access the network, the input being submitted from the user device and including the random password; (v) connect the user device to the network for the single session; and (vi) in response to determining that the single session is terminated or expired, deactivate the account.

Further embodiments, features, and advantages of the invention, as well as the structure and operation of the various embodiments of the invention are described in detail below with reference to accompanying drawings.

These and other features and advantages will become apparent from the following detailed description of illustrative embodiments thereof, which is to be read in connection with the accompanying drawings.

BRIEF DESCRIPTION OF DRAWINGS

The inventive principles are illustrated in the figures of the accompanying drawings which are meant to be exemplary and not limiting, in which like references are intended to refer to like or corresponding parts, and in which:

FIG. 5 is a table that includes information for generating a marketing code which enables the collection and aggregation of information pertaining to users who desire network access in accordance with certain embodiments of the invention.

FIG. 6 is a table that illustrates exemplary records that may be recorded for users who are assigned a network IP address paired with a virtual IP address with a marketing code in accordance with certain embodiments of the invention.

FIG. 7 is a table that illustrates alternative exemplary records that may be recorded for users who are assigned a network IP address paired with a virtual IP address with a marketing code (in this example, hexadecimal) in accordance with certain embodiments of the invention.

DETAILED DESCRIPTION OF THE EMBODIMENTS

Figure 1:
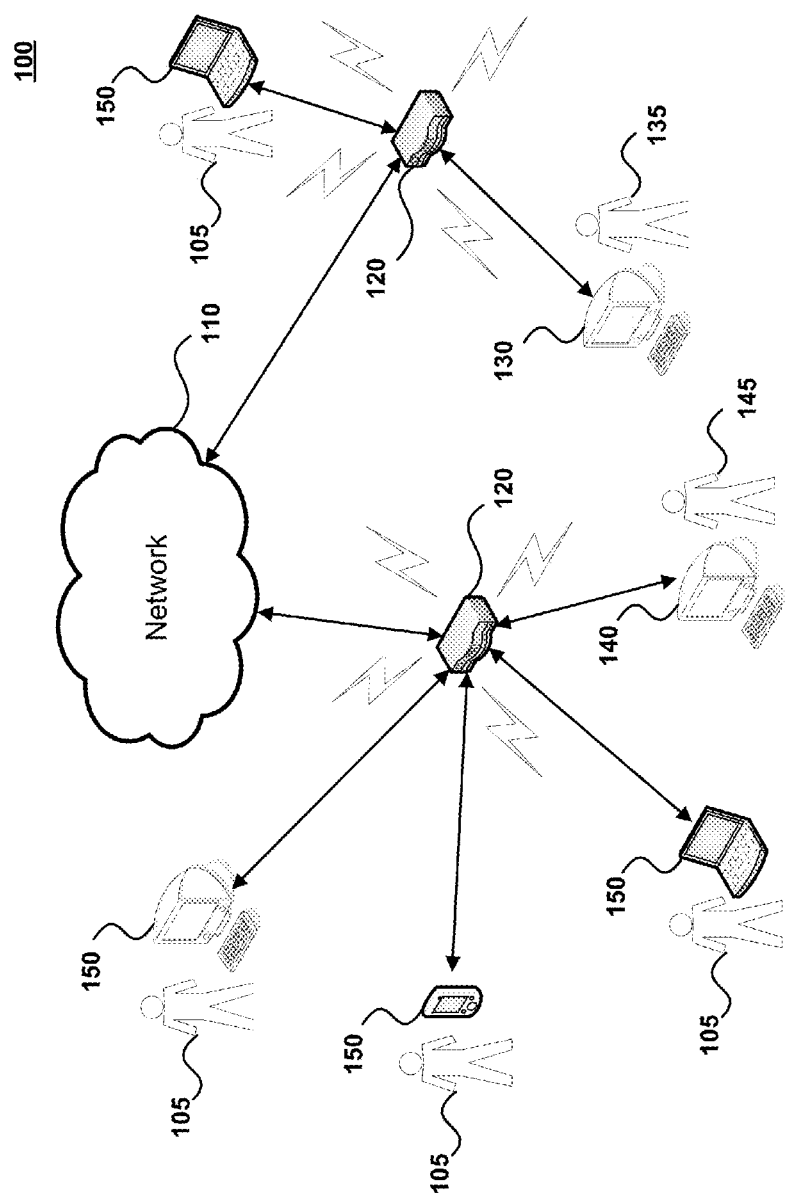
FIG. 1 is a network diagram illustrating a system that provides secure network access to users in accordance with certain embodiments of the invention.

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

The present invention provides systems and methods that enable unregistered users to securely access networks via access points. The unregistered users may utilize user devices (e.g., desktop computers, laptops, mobile devices or other computing devices) to access the network. The access points may represent secure Wi-Fi access points or hotspots or secure hardwired network devices. Internet protocol ("IP") addresses are assigned to the user devices and a random, on-demand, and one-session-only password is dynamically created that enables the unregistered users to access the secure networks.

In certain embodiments, an unregistered user may initially demand or request access to a network (e.g., Wi-Fi access to the Internet) and permission for such access may initially be confirmed or approved by an individual (e.g., by a store manager) or automatically by a user device. The system may include a router that is programmed with an algorithm, or which executes a procedure, that generates and allocates IP addresses to user devices. In certain embodiments, the IP address may be paired with a virtual IP address associated with the user for the purpose of collecting and aggregating marketing information. The router may be further configured to generate a one-session-only, random password that will enable the user to access the network on, and only on, that IP address (which could be paired with a virtual IP address).

The manner in which the password is provided to the unregistered user may vary. The password may be provided to the user either directly or indirectly. In certain embodiments, the system could directly provide the password to the user by transmitting the password to a user device being operated by the user or by displaying it on a kiosk or terminal that permits the user to submit a demand or request for accessing the network. In certain embodiments, the system may indirectly provide the password to the user by initially providing it to a store manager or a clerk who may then communicate or relay the password to the user.

For embodiments in which the password is displayed on a kiosk or a terminal, a set of one or more biometric measurements (e.g., a photograph or fingerprint) of the user may be taken or the user may be required to provide certain identifying information (e.g., a driver's license) at the time the user seeks access to the network. The system may then record the user's activities on the network in a file (e.g., a system log file which records the user's interactions with the network and associates them with the IP address assigned to the user) or database. Exemplary activities that are recorded may relate to websites visited, advertisements selected, purchases made, etc. The system may also be configured to maintain a marketing file or database that stores marketing information associated with the user. This marketing information may be collected and stored, at least in part, using a virtual IP address associated with the user which is indicative of certain demographic characteristics (e.g., age, race and/or gender) associated with the user. The virtual IP address assigned to the user may be stored in the marketing file along with identification information that can be used to uniquely identify the user. In certain embodiments, the identification information may include data associated with the user's biometric measurements (e.g., a photograph or fingerprint) or driver's license and/or a media access control ("MAC") address of a device associated with the user.

In certain embodiments, the password provided to the user will be valid for only one session. In yet other embodiments, an account with a pre-assigned IP address will be deactivated shortly after the network connection is interrupted. In either case, security is improved by preventing hackers from camouflaging their identities with cloned IP addresses. In certain embodiments, if the user disconnects from the network and then subsequently reconnects within a specified period of time, the MAC address of the user device can be used to retrieve the IP address and password that were previously assigned to the user. In certain embodiments, a network administrator may be permitted to define acceptable time periods in which a user can reconnect to the network without requiring the user to go through the setup process where the user is provided with a password and IP address to access the network.

In certain embodiments, the system includes an option for tracking the user's activities on the network and associating those activities with the user's identity using the assigned IP address, or associating those activities with demographic information using the assigned virtual IP address.

In certain embodiments, the system may be configured to monitor and store the user's activities on the network. In certain embodiments, the activities of the users are stored in a system log file that records the activities of all users who access the network. The activities may also be recorded in a separate marketing file that is used to track and aggregate information for individuals according to pre-defined demographic profiles that are associated with virtual IP addresses assigned to the users. For example, demographic information may be obtained from the user at the time the user seeks access to the network (e.g., by permitting the user to fill out a short questionnaire that identifies the user's gender, race, and age, or by permitting the store manager to enter such information via a kiosk or other input device). The demographic information may then be used to select a virtual IP address, which is embedded with a market code that is indicative of the user's demographic profile, and the user's activities may be recorded in a marketing file that is associated with the virtual IP address. As a result, the network activities of demographically similar groups can be aggregated for marketing or other purposes.

In certain embodiments, the system may be configured to restrict or limit an unregistered user's access to the network based on the user's identity or demographic information. For example, the system may be configured to limit access to websites or advertisements based on the age of a child user or other user (e.g., blocking any cigarette advertisement pop-ups to children and teenagers).

The inventive principles set forth in the disclosure are rooted in computer technologies which overcome existing problems in computer networks, specifically problems dealing with inadequate network authentication techniques that permit unregistered users to access a network in an unsecured fashion. As explained above, the current authentication techniques (e.g., such as those which utilize "no-password" or "one-password-for-all" options) render the network vulnerable to security breaches, and further permit users to anonymously access the network without any accountability for malicious or undesired activities which are undertaken on the network. The inventive principles described in this disclosure provide a technical solution (e.g., which utilizes "one-session-only" network authentication techniques to provide access to a network) for overcoming such network security and monitoring issues. This technology-based solution marks an improvement over existing computing capabilities and functionalities related to network authentication by adding additional security measures to the authentication framework and integrating monitoring capabilities that can be used to track and/or restrict activities on the network.

Referring now to the drawings in which like numerals represent the same or similar elements and initially to FIG. 1, a system 100 is disclosed that enables users 105 to securely access a network 110 according to certain embodiments of the invention. The system includes one or more access points 120 that enable user devices 150 to access the network 110. The access points 120 may represent any device that provides wired and/or wireless access to a network and may be incorporated into, or associated with, a router, modem and/or other network device. The network 110 may be any type of network such as one that includes the Internet, a local area network, a wide area network, an intranet, and/or other network. In certain embodiments, the network 110 is a local area network (e.g., Wi-Fi and/or Ethernet network) that is coupled, and provides access, to the Internet. User devices 150 may include, but are not limited to, laptops, personal computers, tablets, e-book readers, smart phones and any other electronic devices that have the ability to communicate via a wireless or wired network connection.

In certain embodiments, the system may be utilized by a company or other entity (e.g., an educational, governmental or religious organization) to provide network access to unregistered users (e.g., users who do not have accounts or credentials for accessing the network via the system). For example, a coffee shop or retail store may offer the system to provide customers with network connectivity while they are sitting in the coffee shop or shopping at the retail location. As explained herein, the system includes various features for providing network connectivity in such settings, including (i) features that enable unregistered customers to quickly access the network in a secure manner, and/or (ii) features that assist with collecting and aggregating marketing information associated with the users. However, it should be understood that the system is not limited to providing network connectively in such settings, and can be utilized to provide network access in any setting and to any user.

In certain embodiments, a user 105 may demand or request access to a network 110 through the access point 120 either directly (e.g., by submitting the demand via a user device 150 or by submitting the demand to a kiosk or terminal at the location associated with the network 110) or indirectly (e.g., by demanding access from a third-party such as a manager 145, clerk or other individual at the location associated with the network 110). In response to the demand being received by the system, the access point 120 or other system component may dynamically generate a "one-session-only" password that enables the requesting user 105 to access the network 110 for a single session (e.g., the period of time during which the user 105 and network 110 are connected and capable of communicating). At the conclusion of the user's single session, the password is disposed of such that it will no longer enable access to the network (e.g., by removing the password from the table or database associating it with the user's account). The password may be comprised of a random sequence of alphanumeric characters or any other random sequence of symbols. The user 105 may be required to enter the random password within a pre-determined period of time (e.g., within ten seconds or a minute after the password is provided to the user). If the user 105 does not enter the password within the pre-determined period of time the password may expire, thus preventing the user 105 from accessing the network 110 with the password. The user 105 may then be required to re-submit a demand or request for another password in order to access the network 110.

Limiting the duration of the password's usability can be accomplished in a variety of different ways. For example, the access point 120 or the manager device 140 may include a timer and may automatically deactivate the password immediately upon the timer's expiration. Also, for example, the access point 120 or the manager device 140 may include one or more functions that are configured to associate a time-stamp with the password when it is created, determine the time when the password for the account is entered, and evaluate whether a pre-determined period of time has elapsed.

The one-session-only password only permits the user 105 to access the network 110 for a single session. Thus, if the user 105 terminates the connection between the user device 150 and the network 110, or the user device 150 is disconnected from the network 110 for other reasons, the password may no longer allow the user 105 to access the network 110. The user 105 may then be required to obtain another password in order to access the network 110. However, in certain embodiments, the user 105 may be permitted to reconnect to the network 110 using the password after a connection is broken so long as the user 105 attempts to reestablish the connection within a pre-determined time period after the connection was broken.

The password generated by the access point 120 or other system component may be disseminated to the user in a variety of different ways. For example, the password may be transmitted directly to a user device 150 that is being operated by the user 105 or displayed on a kiosk being operated by the user 105, or may be provided indirectly to the user by a third-party (e.g., provided by a store manager 145, clerk or other individual who is associated with the location where the access point 120 is situated).

Figure 3:
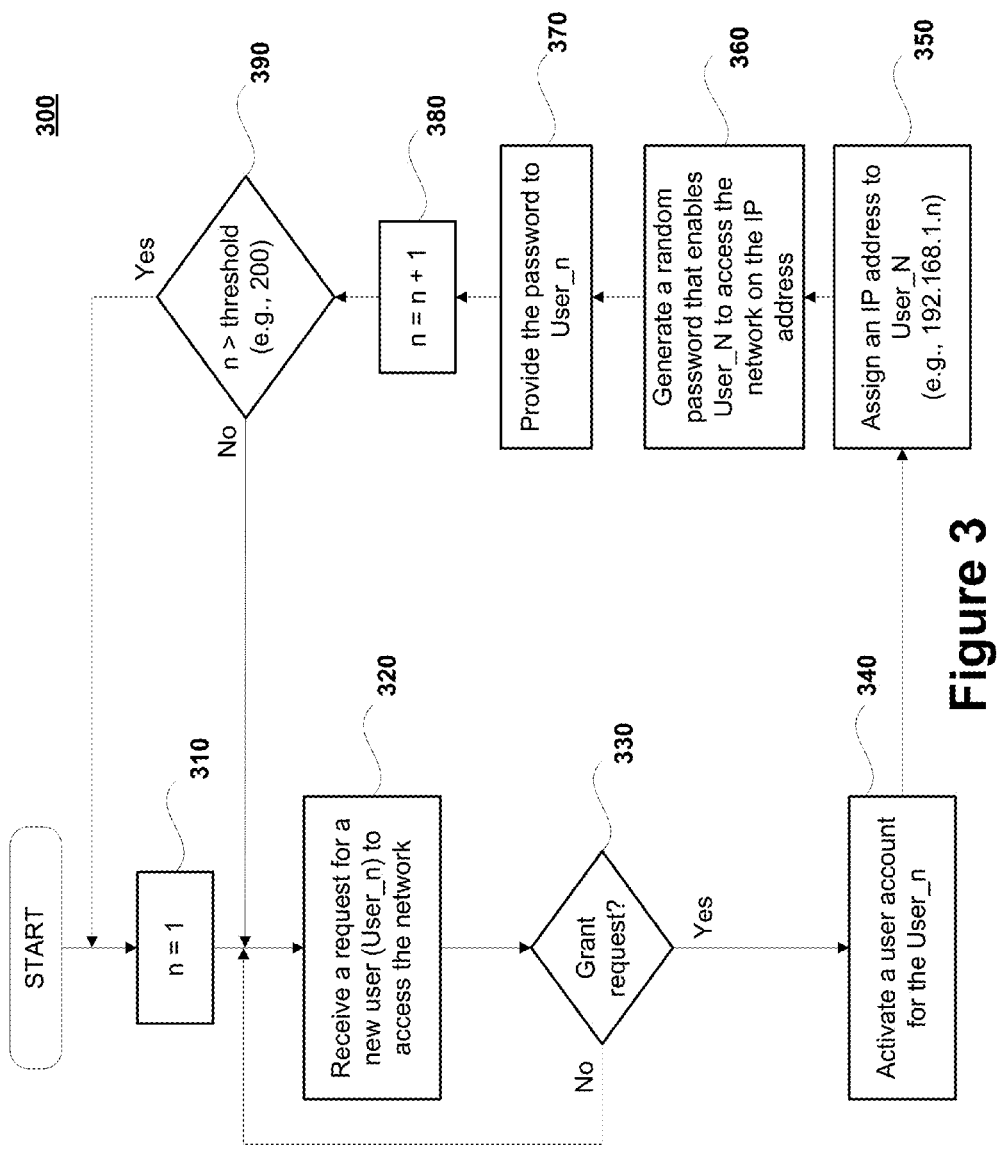
FIG. 3 is a flow chart illustrating an exemplary method for authenticating a user seeking network access with a random, on-demand password in accordance with certain embodiments of the invention.

The access point 120 may also select and assign an IP address to the user 105 demanding access to the network 110. The IP address may be associated with the password that is generated for the user 105. An account may then be activated or created that enables the user to access the network 110 via the assigned IP address. The user may then connect to the network 110 for a single session by submitting the password via a network login prompt or interface. In certain embodiments, all of the functions associated with generating the IP address and generating the password can be performed by the access point 120. FIG. 3, which is discussed in further detail below, describes an exemplary method for activating an account, assigning an IP address, and generating a password for the user.

In certain embodiments, the access point 120 is configured to communicate with one or more administrator devices 130 and manager devices 140. The administrator devices 130 may also be operated by administrative users 135. The manager devices 140 may also be operated by managers 145. A manager device 140 may represent a computing device such as user devices 150. A manager device 140 may provide a web portal (or other type of access) that permits the managers 145 to configure settings associated with the access point 120 and/or network 110, and to perform other related managerial tasks. In general, the web portal may be configured to permit customization of any settings associated with activating user accounts, assigning IP or virtual IP addresses, creating or assigning marketing codes and/or recording activities on the network 110.

In certain embodiments, the system may further include one or more manager devices 140 that are configured to communicate with the access points 120. A manager device 140 may represent a computing device (e.g., a user device 150) or one or more server devices (e.g., a mainframe server device). A manager device 140 may perform functions related to generating, assigning and/or providing virtual IP addresses to the users 105 who are operating user devices 150.

In certain embodiments, the manager device 140 may be operated by a manager 145 (e.g., who may represent an employee, manager or other individual that is associated with the company or entity that is providing the system to the users 105). For example, when a user 105 requests access to the network 110, a manager 145 may submit certain demographic information about the user 105 (e.g., the user's age, race and gender) via a manager device 140 and the system may use the submitted information to generate and assign a virtual IP address to the user device 150 associated with the user 105. In certain embodiments, the manager device 140 may be configured to perform its functions without the assistance of a manager 145. For example, the demographic information pertaining to the user 105 may be provided directly by the user 105 (e.g., by filling out a form displayed on an associated user device 150) and the manager device 140 may generate and assign a virtual IP address without the assistance of a manager 145.

Each of the virtual IP addresses assigned to the users 105 may represent or include a marketing code that identifies specific demographic profiles associated with the users. In certain embodiments, the marketing code may be comprised of a 3-character string wherein each character is an indicator of a specific demographic characteristic. Exemplary demographic characteristics that may be associated with the marketing codes may include: gender, race, age, religious affiliation, income, nationality, marital, education, status, or ethnicity. Other types of demographic characteristics (e.g., spending habits) may also be used.

In certain embodiments, once the user 105 successfully utilizes the password to log in to the network 110, the IP address of the user's device may be paired with a virtual IP address that is embedded with the marketing code (e.g., by associating the IP address and the virtual IP address in a table or database). An exemplary application of this pairing procedure is described in further detail below with reference to FIGS. 4 and 6. As described in further detail below, the IP address and/or virtual IP address associated with the user may be used to monitor and record activities of the user 105. In certain embodiments, any or all functions performed by the manager device 140 may alternatively be performed by the access point 120, including any functionality associated with generating and assigning the marketing code to the virtual IP address and tracking user activities.

In certain embodiments, the network activities of the user 105 may be tracked and stored in a file or database (e.g., a marketing file or database). The file or database may be stored and maintained on the administrator device 130, access point 120 or other component of the system. Any interactions a user 105 has with the network 110 may be monitored by the access point 120 and/or administrator device 130. For example, the access point 120 and/or administrator device 130 may track and store information that indicates websites the user has accessed, purchases the user has made, advertisements the user has clicked on, or any other activity. The stored activity information may be associated with a personal profile that is specific to the user 105 (e.g., using information that uniquely identifies the user) and/or a demographic profile that is associated with the marketing code assigned to the user 105.

In certain embodiments, the administrator device 130, access point 120 or other device may be configured to aggregate information relating to particular demographic groups, users and/or groups of users based on the stored activity information. For example, the aggregated activity information may be processed to provide information that indicates interests, web-surfing patterns or purchase history patterns for particular demographic groups associated with the marketing codes and/or for particular users.

There are various uses for such data. For example, the information described above may be used (i) to generate reports that can be provided or sold to marketing companies or advertisers, or (ii) to customize, or permit advertisers to customize, the selection of advertisements that are displayed to users 105 accessing the network through the access point 120 (e.g., without the need for cookies).

As explained above, the system may be configured to display the password on a kiosk or a terminal in certain embodiments. At the time the user 105 seeks access to the network, a set of one or more biometric measurements (e.g., photograph or fingerprint) of the user 105 may be taken or the user 105 may be required to provide certain identifying information (e.g., a driver's license) via the kiosk or terminal. The access point 120 or other system component may then record in a file (e.g., a system log file) the user's activities on the network (e.g., websites visited on the Internet), and maintain that file along with a table associating it with the user's identifying information—including, for example, the biometric measurements (e.g., photograph), the driver's license, and/or the MAC address of the user device 150. These techniques may assist with providing a greater level of security (e.g., against possible use of the network for criminal activities). For example, if law enforcement personnel are able to identify a certain user (e.g., by biometric measurements such as a photograph or fingerprint, driver's license, or MAC address) as a potential suspect in a crime, the administrator can provide a system log file of the user's activities upon request.

Other types of security measures may also be incorporated into the system.

It should be recognized that each of the user devices 150 operated by the users 105, administrator device 130 operated by the administrator 135, manager device 140 operated by the manager 145 and access points 120 illustrated in FIG. 1 may be configured to communicate via wired or wireless links, or a combination of the two. Each may be equipped with one or more computer storage devices (e.g., RAM, ROM, PROM, SRAM, etc.) and one or more processing devices (e.g., a central processing unit) that are capable of executing computer program instructions. The computer storage devices are preferably physical, non-transitory mediums.

Figure 2:
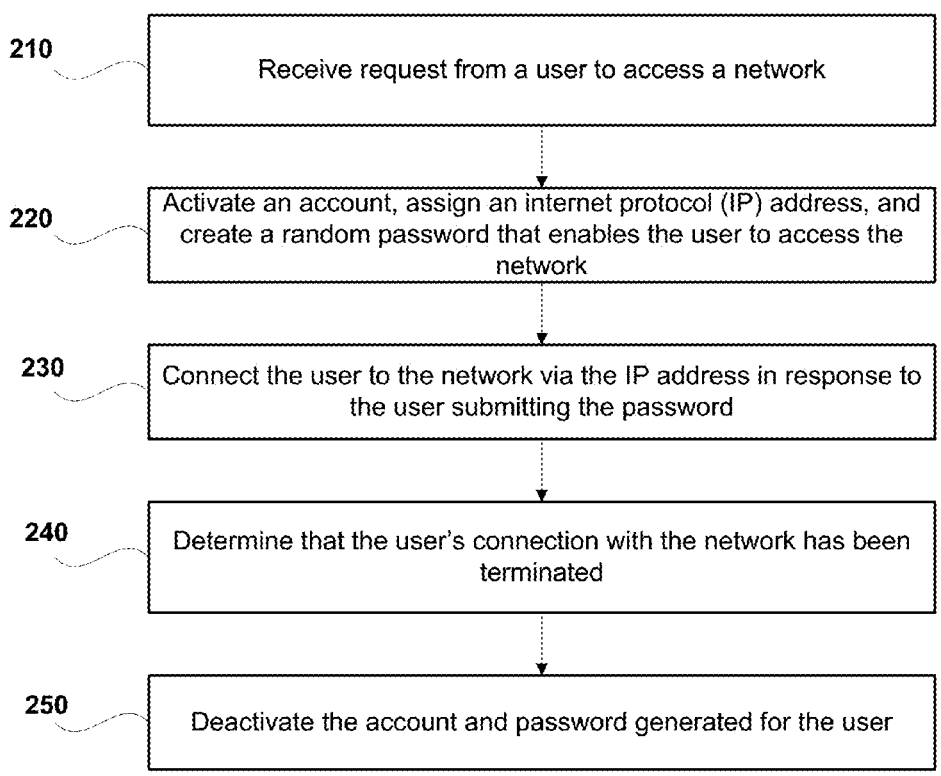
FIG. 2 is a flow chart illustrating an exemplary method for providing secure network access to users in accordance with certain embodiments of the invention.

FIG. 2 is a flow chart illustrating an exemplary method 200 for enabling a user to securely access a network 110 via a secure access point 120 (e.g., Wi-Fi or wired) according to certain embodiments of the invention. In certain embodiments, the method may be executed, at least in part, by the access point 120 illustrated in FIG. 1.

In step 210, a request or demand for access to a network 110 is received from a user 105. The demand or request may be transmitted by a user device 150 operated by the user 105 and may be received at an access point 120. In certain embodiments, the request or demand can be transmitted in-person (e.g., by verbally requesting access) or via a kiosk device or similar terminal.

In step 220, in response to receiving the user's demand or request, the system activates an account (e.g., by updating a table to include information that allows the user to login with the password via the IP address, which could be performed by the access point 120) for the user 105, selects one of a plurality of IP addresses to be assigned to the user 105, and generates a random one-session-only password that enables access to the network 110 via the selected IP address. The password may then be provided to the user either directly or indirectly. FIG. 3, which is discussed below, illustrates an exemplary method that may be utilized to implement step 220 in accordance with certain embodiments of the invention.

In step 230, in response to the user submitting the password, the user device 150 associated with the user 105 is connected to the network 110 via the IP address that was selected for the user 105.

In step 240, a determination is made that indicates that the user's connection has been terminated. The connection may be terminated after a pre-determined time period has elapsed, network connectivity is broken, the user has disconnected from the network, or for other similar reasons. This determination may be made by the access point 120 or related component. In certain embodiments, the password may expire after a very short period of time after the connection has been terminated. The very short duration of the password prevents a user 105 from providing the password to anyone else.

In step 250, the system deactivates the account that was activated for the user. According to certain embodiments of the invention, the user's session terminates and the user is no longer able to access the network using the previously generated account and password.

FIG. 3 is a flow chart associated with a method 300 for authenticating user access to network 110 via a secure access point according to certain embodiments of the invention. In certain embodiments, the method may be executed, at least in part, by the access point 120.

In step 310, the system is in initial or startup stage (e.g., the router is in power-on or after re-boot) and variable n is assigned to 1. The variable n may represent a number that is associated with, and used to identify, an unregistered user who desires access to the network 110. The unregistered user may demand access to the network utilizing a user device 150 or by demanding access indirectly from an individual (e.g., store manager 145 or clerk).

In step 320, a demand to generate a one-session-only password and IP address for the user is transmitted to, and received by, the access point 120. The demand may be transmitted by a manager device 140 and/or user device 150. The ability to submit the demand can be restricted or unrestricted. For example, an administrator can configure the system in at least three ways:
  (1) Basic security setting: The demand may be submitted in response to a user selecting a key or providing other input on a designated device (e.g., a user device, kiosk or a terminal);
  (2) Enhanced security setting: The demand may be submitted in response to a manager or other personnel entering a password or secret string of characters (e.g., if the administrator seeks to restrict access to only certain store personnel); or
  (3) Market intelligence gathering setting: The demand may be submitted after a marketing code for a user has been entered. This marketing code may automatically be generated in response to a user, store clerk, manager or other individual entering demographic information pertaining to the user (e.g., such as the user's gender, race, age, etc.). In certain embodiments, the system may be configured such that it will only generate a password and/or virtual IP address for a user if a marketing code or demographic information is received for the user, or if the system is able to obtain marketing information in some other manner.

In step 330, the system determines whether or not to grant the demand for network access. The system may deny the demand if restrictions are imposed on the system in the manner described above and the necessary information is not received (e.g., if the system is configured as described in option (3) above and the necessary marketing information is not received). If the demand is denied, the method reverts back to step 320.

If the demand is granted (Y in step 330), the system will proceed to the step 340. In step 340, the system activates a user account for the user (referred to as User_n) representing the nth user demanding access to the network.

In step 350, the system assigns an IP address to User_n. In certain embodiments, the IP address may be generated according to one of the following formats: 192.168.1.n or 192.168.0.n.

In step 360, the system generates a random password for User_n.

In step 370, the system displays the password that was generated for User_n. The password may be displayed on a manager device 140, user device 150, and/or designated device (e.g., a kiosk).

In various embodiments, the user 105 may be required to enter the password on the user device 150 within the sight of the manager 145 or in a designated location (e.g., isolated from other people), in order to reduce the risk of hacking or cloning the password.

Also, in various embodiments, once the unregistered user successfully logs in with that password, the unregistered user device's IP address is paired with a virtual IP address which is embedded with a marketing code (as explained in further detail with reference to FIGS. 4, 5, 6, and 7 below).

In step 380, the system increases variable n by 1 for the next user who demands access.

In step 390, the system determines if the number of users exceeds a predetermined maximum number. In certain embodiments, this maximum threshold may be utilized for network administration purposes to account for certain constraints (e.g., if the number of IP addresses available is limited or if there is limited bandwidth or capacity).

In the exemplary method illustrated in FIG. 3, the system restricts network access to a maximum of 200 users at any single time. If the value of n does not exceed 200, then the method proceeds to step 320 and processes access demands from users in the same manner as discussed above. However, if the value of n exceeds 200, then the method may proceed back to step 310 where the value of n is reset to 1. In this case, the first user's access may be terminated (if still connected) to make room for the $201^{st}$ user. In certain embodiments, the system could determine and limit user access in other ways. For example, the next user could be prevented from using the system until one of the 200 IP addresses becomes available.

In certain embodiments, the methods and systems of the present invention described herein are implemented according to the method shown in FIG. 3. The invention can be implemented using software, hardware, and operating system implementations other than those described herein. Any software, hardware, and operating system implementation suitable for performing the functions described herein can be used.

As explained above, demographic information may be obtained from the user at the time the user seeks access to the network 110 for marketing or other purposes.

For example, the demographic information may be provided by the user filling out a short questionnaire, or the store manager or clerk may enter demographic information concerning the user's gender, race, and age (e.g., via the manager device 140). As demonstrated below with the respect to FIGS. 4 and 5, the access point 120 or other system component may then convert this demographic information into a marketing code using a stored table and associated software procedure or algorithm.

Figure 4:
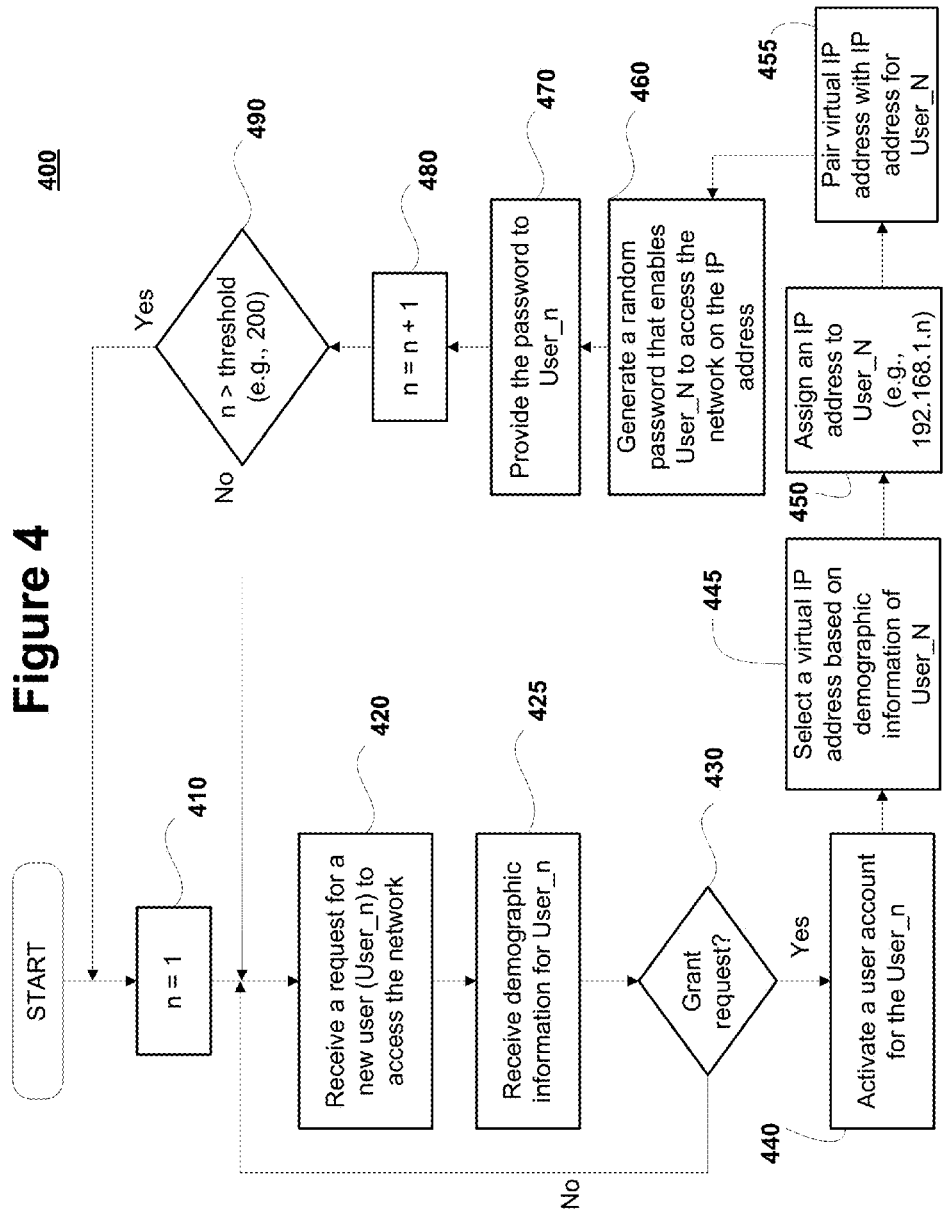
FIG. 4 is a flow chart illustrating an exemplary method for utilizing virtual IP addresses (e.g., multiple-character labels or addresses that do not represent actual physical network interfaces) to collect marketing information in accordance with certain embodiments of the invention.

FIG. 4 is a flow chart associated with a method 400 for pairing the unregistered user device's IP address with a virtual IP address which is embedded with a marketing code, according to certain embodiments of the invention. In certain embodiments, the method 400 may be executed, at least in part, by the access point 120.

In the embodiment illustrated by FIG. 4, steps 410, 420, 430, 440, 450, 460, 470, 480, and 490 of FIG. 4 are identical or similar to, respectively, steps 310, 320, 330, 340, 350, 360, 370, 380, and 390 of FIG. 3.

In step 420 (as in step 320), a demand to generate a one-session only password and IP address for the user is transmitted, and received by, the access point 120. At the time of this demand, the access point 120 executes a procedure that is utilized to collect demographic information for user 105.

In step 425, demographic information of the user 105 is received by access point 120. The demographic information may be transmitted by a manager device 140 and/or user device 150.

In steps 430 and 440 (which are identical, respectively to steps 330 and 340), the system determines whether network access should be granted and, if it is, activates the user account.

In step 445, the system assigns a virtual IP address to User_n. In certain embodiments, the virtual IP address may be generated according to one of the following formats: 192.168.1.n or 192.168.0.n. In certain embodiments, the virtual IP address is selected based on the table set forth in FIG. 6.

In step 450, the system assigns an IP address to User_n. In certain embodiments, the IP address may be generated according to one of the following formats: 192.168.1.n or 192.168.0.n.

In step 455, the system pairs the virtual IP address with the IP address for User_n.

In steps 460 through 470 (which are identical, respectively, to steps 360 and 370), the system generates a random password for and displays it to User_n.

FIG. 5 is an exemplary table 500 that illustrates how marketing codes may be generated and assigned to users in step 445. In this table, each of three categories of demographic information of the user—gender, age, and race—are represented by certain numbers from 0 through 9. A 3-digit marketing code may be created by combining the numbers associated with each of categories. For example, a white female in her 20's may be assigned 021, while a black male in his 50's may be assigned 152. In certain embodiments, the access point 120 or other system component may store data or code that generates tables and/or marketing codes as explained with respect to the table in FIG. 5.

The marketing code may be used to transform a regular IP address to a virtual IP address for each user. The system may be configured to track the user's activities on the network using the IP address and record information associated with the activities in a file or database (e.g., a system log file or database). The system may also simultaneously record those activities in another file (e.g., a marketing file) which is paired with the virtual IP address that was created based on the marketing code. The network activities of demographically similar groups may then be aggregated for marketing or other purposes. All of the above functions associated with generating IP addresses, tracking activities and/or recording activities may be performed by the access point 120 or other system component.

FIG. 6 provides a table 600 that includes exemplary information about temporary accounts that have been activated for unregistered users. In this example, six customers enter a coffee shop during a one-hour period. Each user's demographic information is collected and converted into a 3-digit marketing code according to the table in FIG. 5. The system then generates a virtual IP address, the last three digits of which are the marketing code. The network activities of the users may then be recorded in the marketing file (not shown) that is associated with the virtual IP address and/or marketing code. In this example, the network activities of two of the customers (i.e., Kevin and Tom) may be stored and associated with a record that is created for the virtual IP address 192.168.1.141. Thus, any customer or user having the same characteristics as Kevin and Tom would be collected and aggregated in this record.

In certain embodiments, the demographic information collected could be used to restrict or limit an unregistered user's access to the network or to block transmission of data from the network based on the user's identity or demographic information. For example, the system could incorporate an algorithm that restricts access to certain websites on the Internet or blocks certain data transmitted from the network for any IP addresses provided to an unregistered user who is under a certain age. In this example, with reference to FIG. 5 and FIG. 6, Winifred, a customer who is under 20 years old, enters a coffee shop. After her demographic information is collected and converted as set forth above, the system would automatically limit Winifred's access to certain websites on the Internet because the virtual IP address provided to her is so restricted as a result of her age. For example, with reference to FIG. 1, the access point 120, administrator device 130, or manager device 140 may not permit Winifred to access data on certain websites (e.g., websites that contain adult material).

In another embodiment, the system would automatically block data transmitted from the network to Winifred because the virtual IP address provided to her is so restricted as a result of her age. For example, with reference to FIG. 1, the access point 120, administrator device 130, or manager device 140 may block the transmission of data from the network (e.g., any cigarette advertisement pop-up) to Winifred.

The illustrations reflected in FIG. 5 and FIG. 6 are only examples. For example, other types of demographic information can be collected and stored for users, and any such demographic information may be used to create the marketing codes that are assigned to users. Also, the digits in the virtual IP address need not be represented in a Base-10 format or notation, but can be represented in any other format or notation including Base-16 (hexadecimal), Base-32 and Base-64 formats or notations. In certain embodiments, one of the digits could identify spending habits of the user and a hexadecimal digit could identify spending habits in accordance with the exemplary table 700, as reflected in FIG. 7. Other types of variations are also contemplated.

The above descriptions are intended to be illustrative and not restrictive. For example, the above-described examples (or one or more aspects thereof) may be used in combination with each other. Other embodiments can be used, such as by one of ordinary skill in the art upon reviewing the above description. The abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

It should be noted that in the various embodiments of the invention, an actual IP address could be paired with the virtual IP address.

It should be noted that the system FIG. 1 is merely meant to demonstrate an embodiment of an exemplary operating environment that can be utilized in conjunction with the present invention, and should not be construed as limiting in any manner whatsoever. The particular configuration in FIG. 1 can be altered in numerous ways without departing from the principles herein. For example, the functionality of the manager and administrator devices 140 and 130, respectively, in FIG. 1 may be carried out by a plurality of devices. Likewise, although the figure depicts a single manager device 140 and a single administrator device 130 in communication with three client devices 150, any number of manager devices 140, administrator devices 130, and client devices 150 may be incorporated into the system and the system may be configured in a variety of different ways. Furthermore, it should be recognized that some or all of the functionality executed by the access point 120 may be performed locally on the manager and/or administrator devices 140 and 130, respectively.

The embodiments described in this disclosure can be combined in various ways. Any aspect or feature that is described for one embodiment can be incorporated in any other embodiment mentioned in this disclosure. Moreover, any of the embodiments described herein may be hardware-based, software-based and preferably comprise a mixture of both hardware and software elements. Thus, while the description herein may describe certain embodiments, features or components as being implemented in software or hardware, it should be recognized that any embodiment, feature or component that is described in the present application may be implemented in hardware and/or software. In certain embodiments, particular aspects are implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer-readable medium may include any apparatus that stores, communicates, propagates or transports the program for use by or in connection with the instruction execution system, apparatus, or device. The medium can be a magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

While various novel features of the invention have been shown, described and pointed out as applied to particular embodiments thereof, it should be understood that various omissions and substitutions and changes in the form and details of the systems and methods described and illustrated, may be made by those skilled in the art without departing from the spirit of the invention. Among other things, the steps shown in the methods may be carried out in different orders in many cases where such may be appropriate. Those skilled in the art will recognize, based on the above disclosure and an understanding therefrom of the teachings of the invention, that the particular hardware and devices that are part of the system described herein, and the general functionality provided by and incorporated therein, may vary in different embodiments of the invention. Accordingly, the particular system components shown in the figures are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation.

What is claimed is:

1. A computerized method for providing an unregistered user with on-demand access to a network for a single session, the method comprising the steps of:

receiving a demand that enables an unregistered user to access the network for a single session only, the unregistered user representing an individual without an existing account or login credentials for accessing the network, the demand including at least one first input that identifies the unregistered user's demographic information;

in response to receiving the demand:

dynamically generating a random password at an access point device that enables the unregistered user to access a temporary account, wherein the temporary account is activated with a processor and enables the unregistered user to access the network for only the single session; and storing address allocation data that is utilized to assign virtual IP addresses to unregistered user devices based on demographic information for unregistered users;

selecting an Internet protocol (IP) address to be assigned to the temporary account;

associating the IP address with the temporary account;

associating the random password with the temporary account such that the random password enables an unregistered user device operated by the unregistered user to access the network with the IP address for only the single session, wherein the random password is temporarily stored on a non-transitory storage medium and the random password only provides access to the network for only the single session when it is used within a pre-determined period of time after the random password is generated;

utilizing the at least one first input in conjunction with the address allocation data to select one of a plurality of virtual IP addresses, wherein each virtual IP address is associated with a separate demographic profile;

pairing said virtual IP address with the IP address for the unregistered user;

receiving a second input at the access point device to access the network, the second input being submitted from the unregistered user device and including the random password;

connecting the unregistered user device to the network for the single session;

recording activities of the unregistered user on the network in a marketing file associated with said virtual IP address; and in response to determining that the single session is terminated or expired, deactivating the temporary account and disposing of the random password.

2. The method of claim 1, wherein each virtual IP address comprises a multiple-character sequence that is encoded such that each character identifies a specific demographic characteristic.

3. The method of claim 1, further comprising:
aggregating the recorded activities of the unregistered users assigned the same virtual IP addresses and having the same demographic profiles; and
extracting marketing information from the aggregated demographic information.

4. The method of claim 1, further comprising:
storing restriction data that imposes limitations on accessing the network based on the demographic information;
in response to providing the unregistered user with access to the network, analyzing the demographic information for the unregistered user in accordance with the stored restriction data; and
limiting access to the network for the unregistered user in response to determining that the demographic information associated with the unregistered user falls within at least one predetermined category of demographic information that is restricted by the stored restriction data.

5. The method of claim 1, further comprising:
storing restriction data that imposes limitations on accessing the network based on the demographic information;
in response to providing the unregistered user with access to the network, analyzing the demographic information for the unregistered user in accordance with the stored restriction data; and
blocking transmission of information from the network to the unregistered user in response to determining that the demographic information associated with the unregistered user falls within at least one predetermined category of demographic information that is restricted by the stored restriction data.

6. The method of claim 1, further comprising:
obtaining identifying information that uniquely identifies the unregistered user;
storing the identifying information for the unregistered user in a user demographic profile file that includes information for individually tracking the user; and
associating the marketing file with the user demographic profile file.

7. The method of claim 6, wherein said identifying information includes data selected from the group consisting of: one or more biometric measurements of the unregistered user, a photograph of the unregistered user, a copy or image of the unregistered user's driver's license, and a media access control (MAC) address of a mobile device associated with the unregistered user.

8. The method of claim 1, wherein the unregistered user is required to enter an additional password before activating said temporary account for the unregistered user.

9. The method of claim 1, further comprising:
designating the temporary account for the unregistered user as inactive immediately upon creation;
activating the temporary account once the unregistered user demands access to the network; and
deactivating the temporary account in response to determining that the random password is not used within a pre-determined period of time after the random password is generated or a pre-determined session period elapses.

10. A system for providing an unregistered user with on-demand access to a network for a single session, the system comprising:
at least one computing device having at least one processor and physical memory, the physical memory storing instructions that cause the at least one processor to:
receive a demand that enables an unregistered user to access the network for a single session only, the unregistered user representing an individual without an existing account or login credentials for accessing the network, the demand including at least one first input that identifies the unregistered user's demographic information;
in response to receiving the demand:
dynamically generate a random password at an access point device that enables the unregistered user to access a temporary account, wherein the temporary account is activated with the at least one processor and enables the unregistered user to access the network for only the single session; and
store address allocation data that is utilized to assign virtual IP addresses to unregistered user devices based on demographic information for unregistered users;
select an Internet protocol (IP) address to be assigned to the temporary account;
associate the IP address with the temporary account;
associate the random password with the temporary account such that the random password enables an unregistered user device operated by the unregistered user to access the network with the IP address for only the single session, wherein the random password is temporarily stored on the physical memory and the random password only provides access to the network for only the single session when it is used within a pre-determined period of time after the random password is generated;
utilize the at least one first input in conjunction with the address allocation data to select one of a plurality of virtual IP addresses, wherein each virtual IP address is associated with a separate demographic profile;
pair said virtual IP address with the IP address for the unregistered user;
receive a second input at the access point device to access the network, the second input being submitted from the unregistered user device and including the random password;
connect the unregistered user device to the network for the single session;

record activities of the unregistered user on the network in a marketing file associated with said virtual IP address; and in response to determining that the single session is terminated or expired, deactivate the temporary account and dispose of the random password.

11. The system of claim 10, wherein each virtual IP address comprises a multiple-character sequence that is encoded such that each character identifies a specific demographic characteristic.

12. The system of claim 10, wherein the instructions further cause the at least one processor to:

aggregate the recorded activities of the unregistered users assigned the same virtual IP addresses and having the same demographic profiles; and extract marketing information from the aggregated demographic information.

13. The system of claim 10, wherein the instructions further cause the at least one processor to:

store restriction data that imposes limitations on accessing the network based on the demographic information;

in response to providing the unregistered user with access to the network, analyze the demographic information for the unregistered user in accordance with the stored restriction data; and limit access to the network for the unregistered user in response to determining that the demographic information associated with the unregistered user falls within at least one predetermined category of demographic information that is restricted by the stored restriction data.

14. The system of claim 10, wherein the instructions further cause the at least one processor to:

store restriction data that imposes limitations on accessing the network based on the demographic information;

in response to providing the unregistered user with access to the network, analyze the demographic information for the unregistered user in accordance with the stored restriction data; and block transmission of information from the network to the unregistered user in response to determining that the demographic information associated with the unregistered user falls within at least one predetermined category of demographic information that is restricted by the stored restriction data.

15. The system of claim 10, wherein the instructions further cause the at least one processor to:

obtain identifying information that uniquely identifies the unregistered user;

store the identifying information for the unregistered user in a user demographic profile file that includes information for individually tracking the unregistered user; and associate the marketing file with the user demographic profile file.

16. The system of claim 15, wherein said identifying information includes data selected from the group consisting of: one or more biometric measurements of the unregistered user, a photograph of the unregistered user, a copy or image of the unregistered user's driver's license, and a media access control (MAC) address of a mobile device associated with the unregistered user.

17. The system of claim 10, wherein the system requires entry of an additional password before activating said temporary account for the unregistered user.

18. The system of claim 10, wherein the instructions further cause the at least one processor to:

designate the temporary account for the unregistered user as inactive immediately upon creation;

activate the temporary account once the unregistered user demands access to the network; and deactivate the temporary account in response to determining that the random password is not used within a pre-determined period of time after the random password is generated or a pre-determined session period elapses.

* * * * *